United States Patent [19]

Nosek

[11] Patent Number: 4,989,342
[45] Date of Patent: Feb. 5, 1991

[54] ACTUATOR FOR A COUNTER ON A DISTANCE MEASURING DEVICE

[76] Inventor: Frank J. Nosek, 1236 Whitingham Cir., Naperville, Ill. 60540

[21] Appl. No.: 422,637

[22] Filed: Oct. 17, 1989

[51] Int. Cl.⁵ ............................ G01B 3/12; G01B 7/04
[52] U.S. Cl. ..................................... 33/780; 33/781; 33/782
[58] Field of Search ............... 33/779, 780, 781, 782, 33/772; 377/24.1, 24.2; 235/95 R, 95 B, 95 C, 103

[56] References Cited

U.S. PATENT DOCUMENTS

| 2,123,360 | 7/1938 | Harris | 33/781 |
| 2,571,682 | 10/1951 | Cochnar | 235/95 R |
| 3,355,101 | 11/1967 | Levinson | 235/95 R |

FOREIGN PATENT DOCUMENTS

| 1239635 | 7/1960 | France | 33/782 |
| 1095655 | 12/1967 | United Kingdom | 33/781 |

Primary Examiner—William A. Cuchlinski, Jr.
Assistant Examiner—Alvin Wirthlin
Attorney, Agent, or Firm—Wood, Phillips, Mason, Recktenwald & VanSanten

[57] ABSTRACT

A distance measuring device is provided consisting of a frame, a wheel mounted to the frame for rotation about an axis and having a peripheral surface to be rolled against a surface to be measured, a distance counter, a lever arm mounted to the counter for pivoting movement between a first position and a second position, a structure on the counter for indicating a predetermined increment of distance as an incident of the lower arm moving from its first position to its second position, structure for normally biasing the lever arm into its first position, structure on the wheel for engaging the lever arm and moving the lever arm from its first position to its second position as an incident of the wheel rotating about its pivot axis in a first direction, and structure on the lever arm for both (1) intercepting the arm-engaging structure on the wheel and (2) deflecting as the arm-engaging structure moves against the intercepting structure with the wheel rotating oppositely to the first direction to thereby allow the arm-engaging structure to pass by the lever arm with the wheel rotating oppositely to the first direction without a detrimental torque being exerted on the lever arm by the arm-engaging structure.

15 Claims, 1 Drawing Sheet

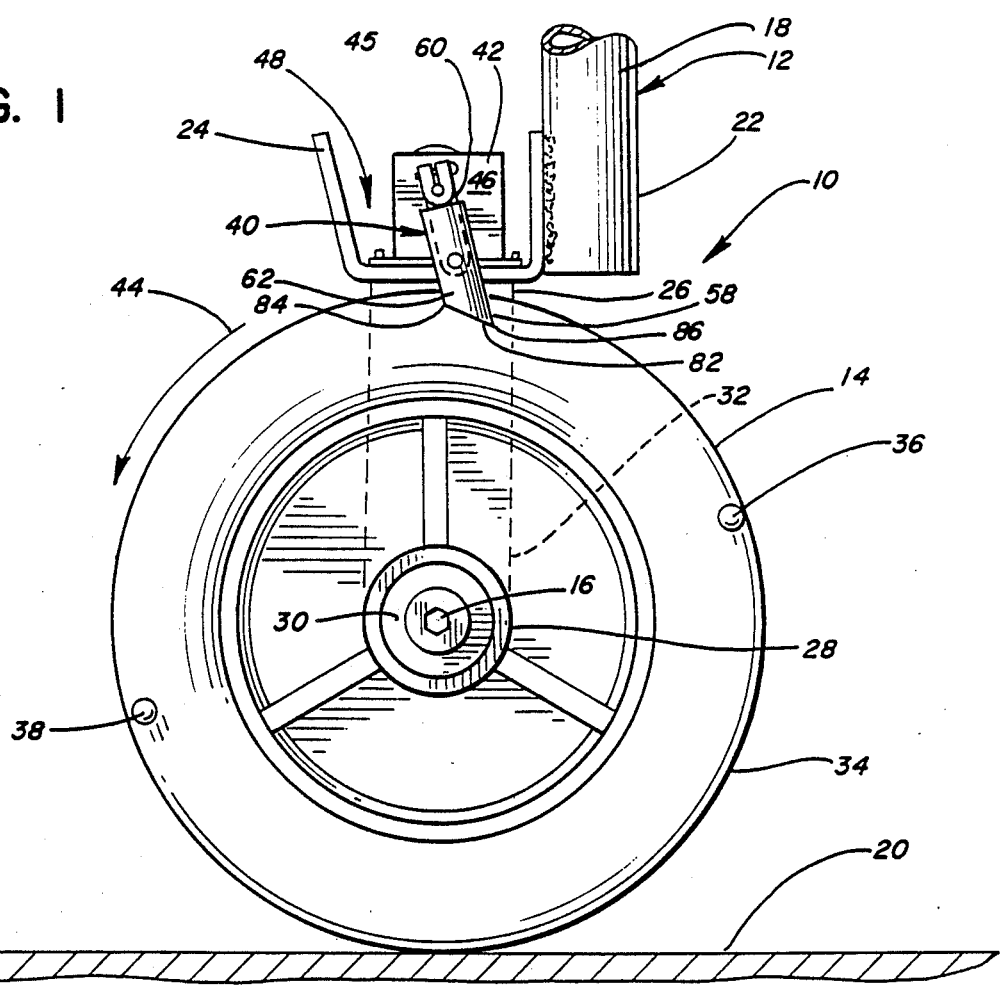
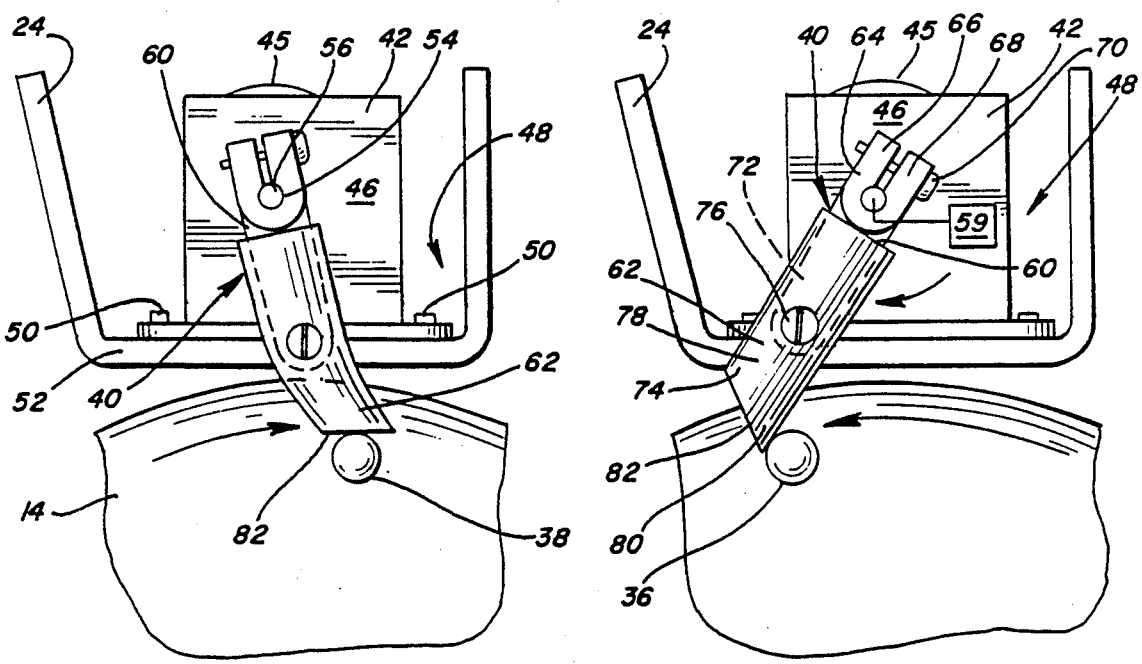

4,989,342

ACTUATOR FOR A COUNTER ON A DISTANCE MEASURING DEVICE

BACKGROUND OF THE INVENTION

1. Field of the Invention

This invention relates to distance measuring devices and, more particularly, to a wheeled distance measuring device with an associated counter.

2. Background Art

Wheeled distance measuring devices are known in the art. It is conventional on such devices to rotatably mount a wheel on a frame that has an integral elongate handle to facilitate control thereof by an operator. The operator uses the handle to roll the wheel against a surface to be measured. As the wheel rotates, a hit pin, or the like, thereon, coacts with a counter. Each time the pin moves past the counter, it operates a lever arm, thereby recording an increment of distance. The counter has a visual display to indicate to the user the distance traversed by the wheel.

One known counter mechanism includes a lever arm which is pivotable between first and second positions and normally biased into the first position. As the wheel rotates, the hit pin engages the lever arm, effects movement of the lever arm from its first position, to its second position to thereby cause an incremental distance to be recorded on the counter, and then moves past the lever arm so that the lever arm is free to pivot under the bias force back to its first position.

The most sensitive and expensive part of the above mechanism is the counter. One problem that has plagued the art is that of the hit pin, over the course of time, inflicting damage on the counter as an incident of the wheel rotating oppositely to its intended direction for measurement. Backward rotation of the wheel causes the pin to jam against the lever arm until the rotation of the wheel is arrested by the counter. After repeated occurrences, the counter may become damaged, thereby necessitating its repair or replacement. The hit pin might also dislodge from the wheel.

SUMMARY OF THE INVENTION

The present invention is specifically directed to overcoming the above enumerated problems in a novel and simple manner.

According to the invention, a distance measuring device is provided consisting of a frame, a wheel mounted to the frame for rotation about an axis and having a peripheral surface to be rolled against a surface to be measured, a distance counter, a lever arm mounted to the counter for pivoting movement between a first position and a second position, a structure on the counter for indicating a predetermined increment of distance as an incident of the lower arm moving from its first position to its second position, structure for normally biasing the lever arm into its first position, structure on the wheel for engaging the lever arm and moving the lever arm from its first position to its second position as an incident of the wheel rotating about its pivot axis in the first direction, and structure on the lever arm for both (1) intercepting the arm-engaging structure on the wheel and (2) deflecting as the arm-engaging structure moves against the intercepting structure with the wheel rotating oppositely to the first direction to thereby allow the arm-engaging structure to pass by the lever arm with the wheel rotated oppositely to the first direction without a detrimental torque being exerted on the lever arm by the arm-engaging structure.

With the inventive structure, the wheel can be rotated freely in either direction without causing damage to the counter.

In a preferred form, the intercepting structure is a flexible free end on the lever arm projecting in cantilever fashion from the counter into the path of the arm-engaging structure. Reverse rotation deflects the lever arm free end, which is sufficiently resilient that it will not transmit a detrimental force to the counter.

In a preferred form, the lever arm has a rigid base, which preferably has an elongate configuration. The flexible element is attached to the rigid base. The flexible element is preferably removably attached to the base so that its removal and replacement is facilitated.

In a preferred form, the intercepting structure on the lever arm consist of a piece of flexible tubing which is attached to the rigid base. The flexible tubing surrounds and frictionally grips the rigid base. A secondary structure can be extended through the tubing and into the base to secure the attachment between the tubing and base.

Preferably, the tubing is configured to have an annular free edge residing substantially within a plane that makes other than a right angle with the tubing axis. The arm-engaging structure acts against and progressively cams the annular free edge of the tubing as the wheel rotates oppositely to the first direction to bend the tubing at its free end and thereby (1) absorb the torque that would otherwise be transmitted to the counter and (2) allow the arm-engaging structure to move past the lever arm. With the wheel rotating in its first direction, the arm-engaging structure abuts the tubing sidewall to positively transmit a torque therethrough to move the lever arm from its first position to its second position.

BRIEF DESCRIPTION OF THE DRAWINGS

FIG. 1 is a side elevation view of a portion of a wheeled measuring device in operative relationship with a subjacent surface along which a distance is to be measured and having a counter, according to the present invention, incorporated therein;

FIG. 2 is an enlarged, fragmentary view of cooperating structure on the counter and wheel for recording distances as the wheel is rolled along the subjacent surface; and FIG. 3 is a view as in FIG. 2 with the wheel being rolled oppositely to the direction in which distances are recorded.

DETAILED DESCRIPTION OF THE DRAWINGS

A wheeled measuring device, according to the present invention, is shown at 10 in FIG. 1 and consists of a frame 12 to which a wheel 14 is mounted for rotation about an axis 16.

The frame 12 consists of an elongate, tubular handle 18 which is sufficiently long to facilitate gripping thereof by a user at an end (not shown) remote from the wheel 14, to allow a user to stand in an upright position and effect rolling of the wheel 14 against a subjacent surface 20 along which a distance is to be measured. The lower end 22 of the handle 18 has a counter support bracket 24 from which a leg 26 depends. A hub 28 on the wheel 14 is secured, as through a bolt 30, to the lower end 32 of the leg 26 for rotation.

In operation, the user grasps the handle 18 and rolls the peripheral surface 34 of the wheel 14 firmly against the subjacent surface 20 on which a measurement is to be taken. As the wheel 14 is rotated, diametrically opposite pins 36,38, extending axially from adjacent the radially outer portion of the wheel 14, cooperate with a lever arm 40 on a counter 42 to record an increment of distance upon each pin 36, 38 engaging and moving the lever arm 40 from the FIG. 1 position to the FIG. 2 position as the wheel rotates in the direction of arrow 44. A display 45 on the top of the counter 42, gives the user a visual indication of the recorded distance.

The present invention is concerned with the counter 42, and, more particularly, to the actuating lever arm 40 associated therewith. The counter 42 has a squared housing 46 which nests in a receptacle 48 defined by the frame 12 and, as seen in FIG. 3, is fixedly secured, as by bolts, rivets or the like 50, securely to the bottom wall 52 bounding the receptacle 48.

The counter 42 is operated by reciprocating pivoting movement of a shaft 54 thereon, about an axis 56. That is, each time the lever arm 40 moves from its FIG. 1 position in a clockwise direction about pivot axis 56 to its FIG. 2 position, a predetermined increment is recorded in the counter 42. The shaft 54 is normally biased by a conventional structure, shown schematically at 59 in FIG. 2, to the FIG. 1 position.

The lever arm 40 is engaged and pivoted between its FIG. 1 and FIG. 2 positions by the pins 36,38 on the wheel 14. It can be seen in FIG. 1 that rotation of the wheel 14 in a counterclockwise direction from the FIG. 1 position causes the pin 36 to bear against the edge 58 on the arm 40. Continued rotation of wheel 40 causes the pin 36 to slidably bear against the edge 58 until the FIG. 2 position is realized whereupon a single increment is recorded by the counter 42. Further rotation of the wheel 14 in a counterclockwise direction from the FIG. 2 position causes the pin 36 to move past the lever arm 40 whereupon the biasing means 59 drives the arm 40 from the FIG. 2 position in a counterclockwise direction around pivot axis 56 back to the FIG. 1 position. Pin 38 then encounters the arm 40 and moves the arm 40 in the same manner as the pin 36, as described above.

The number of pins 36,38 utilized is a matter of design choice. With two pins 36, 38 employed, the increments recorded by the counter 42 are equal to one/half of the circumference of the wheel 14. With a single pin 36, 38 the increments are equal to the circumference of the wheel 14, and so on.

The present invention contemplates configuration of the lever arm 40 so that the pins 36,38 positively actuate the arm 40 with the pins 36,38 rotated thereagainst in a counterclockwise direction and so that movement of the pins 36,38 against and past the lever arm 40 in the FIG. 1 position with the wheel rotated in the clockwise direction can occur without the pins 36,38 becoming jammed with the arm 40 or producing a detrimental torque on the lever arm 40 in its FIG. 1 position.

To accomplish the above, lever arm 40 consists, of two primary pieces—a rigid base 60 and a flexible element 62, as seen in FIG. 2. The base 60 has a U-shaped end 64 that surrounds the shaft 54. The spaced end parts 66, 68 are squeezed together by a bolt 70 so that the end 68 positively captures the shaft 54 and rotates therewith.

The base 60 has an elongated body 72 which projects at right angles to the pivot axis 56. The body 72 is not long enough to extend into the path of the pins 36,38. Instead, a flexible element 74, which is preferably a piece of flexible vinyl tubing, surrounds and frictionally grips the body 72. The body 72 and flexible element 74 are relatively dimensioned so that the tubing at 74 can be pressed lengthwise over the body 72 into its operative position, shown in the drawings. A screw 76 extends through the peripheral wall 78 of the tubing 74 and into the body 72 to prevent the tubing 74 from sliding off of the body 72.

The free tubing end 80 is cut to define an annular free edge 82 that resides substantially within a plane that is nonperpendicular to the axis of the tubing 74. Upon the pins 36,38 moving with the wheel 14 in a counterclockwise direction, with the lever arm 40 in the FIG. 1 position, the pins 36,38 bear against the edge 58 of the flexible tubing 74, which extends unsupported from the body 72 in cantilever fashion, and positively move the lever arm 40 from its FIG. 1 position to its FIG. 2 position. The tubing diameter, and the length thereof extending unsupported from the body 72, are chosen so that the tubing 74 has sufficient rigidity to transmit the torque from pins 36,38 to the counter mechanism 42 to effect operation thereof as an incident of the wheel 14 rotating in a counterclockwise direction.

Upon the wheel 14 being rotated in clockwise direction, with the device 10 in the FIG. 1 orientation, the pin 38 encounters the side 84 of the edge 82 and progressively cams the edge 82 as the pin 38 moves towards the other side 86 of the surface 82. As the pin 38 wedges against the edge 82, the unsupported portion of tubing 74 progressively deforms, as seen in FIG. 3, until the pin 38 moves past the arm 42 as the wheel 14 rotates clockwise beyond the FIG. 3 position. Accordingly, the torque from the pin 38 is absorbed by the bending tubing 74, which also deforms sufficiently to permit passage of the pins 36,38 past the lever arm 40.

The foregoing disclosure of specific embodiments is intended to be illustrative of the broad concepts comprehended by the invention.

I claim:

1. A distance measuring device comprising:

a frame;

a wheel mounted to the frame for rotation in opposite directions about an axis and having a peripheral surface to be rolled against a surface to be measured;

a distance counter;

a lever arm mounted to said counter for pivoting movement about an axis between a first position and a second position;

means on said counter for indicating a predetermined increment of distance as an incident of said lever arm moving from said first position to said second position;

means for normally biasing the lever arm to said first position;

means on said wheel for engaging for the lever arm and moving the lever arm from its first position to its second position as an incident of said wheel rotating about its pivot axis in a first direction; and flexible means on the lever arm pivotable about the lever arm axis for intercepting the arm-engaging means and deforming as the arm-engaging means moves against the intercepting means with the wheel rotating oppositely to said first direction to thereby allow said arm-engaging means to pass by the lever arm with the wheel rotated oppositely to said first direction without a detrimental torque being exerted by said arm-engaging means on the lever arm and counter, said means on the lever arm comprising a piece of flexible hollow tubing.

2. The distance measuring device according to claim 1 wherein said hollow tubing comprises a flexible free end on said lever arm projecting in cantilever fashion from said counter into the path of the arm-engaging means as the wheel is rotated.

3. A distance measuring device comprising:
 a frame;
 a wheel mounted to the frame for rotation in opposite directions about an axis and having a peripheral surface to be rolled against a surface to be measured;
 a distance counter;
 a lever arm mounted to said counter for pivoting movement about an axis between a first position and a second position;
 means on said counter for indicating a predetermined increment of distance as an incident of said lever arm moving from said first position to said second position;
 means for normally biasing the lever arm to said first position;
 means on said wheel for engaging for the lever arm and moving the lever arm from its first position to its second position as an incident of said wheel rotating about its pivot axis in a first direction; and
 flexible means on the lever arm pivotable about the lever arm axis for intercepting the arm-engaging means and deforming as the arm-engaging means moves against the intercepting means with the wheel rotating oppositely to said first direction to thereby allow said arm-engaging means to pass by the lever arm with the wheel rotated oppositely to said first direction without a detrimental torque being exerted by said arm-engaging means on the lever arm and counter,
 wherein said lever arm has an elongate rigid base and the flexible means on the lever arm comprises a piece of flexible tubing that is attached to the rigid base with the length of the rigid base aligned with the lengthwise axis of the flexible tubing.

4. The distance measuring device according to claim 3, wherein said flexible tubing is hollow and surrounds and frictionally grips the rigid base.

5. The distance measuring device according to claim 4 including means extending through the flexible tubing and into the rigid base to secure the attachment of the flexible tubing to the rigid base.

6. The distance measuring device according to claim 3 wherein said flexible tubing is made from vinyl.

7. A distance measuring device comprising:
 a frame;
 a wheel mounted to the frame for rotation in opposite directions about an axis and having a peripheral surface to be rolled against a surface to be measured;
 a distance counter;
 a lever arm mounted to said counter for pivoting movement about between a first position and a second position;
 means on said counter for indicating a predetermined increment of distance as an incident of said lever arm moving from said first position to said second position;
 means for normally biasing the lever arm to said first position;
 means on said wheel for engaging for the lever arm and moving the lever arm from its first position to its second position as an incident of said wheel rotating about its pivot axis in a first direction; and
 means on the lever arm intercepting the arm-engaging means and deflecting as the arm-engaging means moves against the intercepting means with the wheel rotating oppositely to said first direction to thereby allow said arm-engaging means to pass by the lever arm with the wheel rotated oppositely to said first direction without a detrimental torque being exerted by said arm-engaging means on the lever arm and counter,
 wherein said lever arm has a rigid base and the means on the lever arm comprises a piece of flexible tubing that is attached to the rigid base,
 wherein the flexible tubing has a free end with an annular free edge that resides substantially within a plane that makes other than a right angle with the tube axis, and said arm-engaging means acts against and progressively cams the annular free edge of the tubing as the wheel rotates oppositely to said first direction.

8. A distance measuring device comprising:
 a frame;
 a wheel mounted to the frame for rotation about an axis and having a peripheral surface to be rolled against a surface to be measured;
 a distance counter;
 a lever arm mounted to said counter for pivoting movement about between a first position and a second position;
 means on said counter for indicating a predetermined increment of distance as an incident of said lever arm moving from said first position to said second position;
 means for normally biasing the lever arm to said first position;
 means on said wheel for engaging for the lever arm and moving the lever arm from its first position to its second position as an incident of said wheel rotating about its pivot axis in a first direction; and
 means on the lever arm intercepting the arm-engaging means and deflecting as the arm-engaging means moves against the intercepting means with the wheel rotating oppositely to said first direction to thereby allow said arm-engaging means to pass by the lever arm with the wheel rotated oppositely to said first direction without a detrimental torque being exerted by said arm-engaging means on the lever arm and counter,
 wherein said lever arm has a rigid base and the means on the lever arm comprises a piece of flexible tubing that is attached to the rigid base,
 wherein the flexible tubing has a peripheral wall and a cut free annular edge remote from the rigid base, said flexible tubing edge being configured so that the arm-engaging means engages the peripheral wall of the flexible tubing to move the lower arm from its first position to its second position as the wheel is pivoted in the first direction and engages the cut free edge of the flexible tubing to progressively bend the flexible tubing as the wheel is pivoted oppositely to said first direction.

9. A distance measuring device comprising:
 a frame;

a wheel mounted to the frame for rotation about an axis and having a peripheral surface to be rolled against a surface to be measured;

at least one elongate pin projecting from the wheel in a direction generally parallel to the wheel pivot axis at a location spaced from the wheel pivot axis;

a distance counter;

a lever arm mounted to said counter for pivoting movement about an axis between a first position and a second position;

means on said counter for indicating a predetermined increment of distance as an incident of said lever arm moving from said first position to said second position;

means for normally biasing the lever arm to said first position; and flexible means on the lever arm pivotable about the lever arm axis and residing within the path of the pin as the wheel is rotated for (1) engaging and positively transmitting a torque produced by the pin to the lever arm to pivot the lever arm from its first position to its second position as an incident of the wheel being rotated in the first direction and allowing the pin to move against and past the lever arm and flexible means thereon without substantially deforming the flexible means and for (2) deforming in response to a torque produced thereon by said pin with the wheel rotating oppositely to said first direction so that the torque produced by the pin with the wheel rotating oppositely to said one direction is diminished by said flexible means on the lever arm so as not to be transmitted directly to said lever arm, wherein said lever arm has a rigid base and the means on the lever arm comprises a piece of hollow flexible tubing attached to the rigid base.

10. The distance measuring device according to claim 9 wherein the tubing piece surrounds and frictionally grips a portion of the rigid base.

11. The distance measuring device according to claim 10 wherein means extend through the tubing piece and into the rigid base to secure the attachment of the tubing piece to the rigid base.

12. The distance measuring device according to claim 9 wherein the tubing piece is made from vinyl.

13. A distance measuring device comprising:

a frame;

a wheel mounted to the frame for rotation about an axis and having a peripheral surface to be rolled against a surface to be measured;

at least one elongate pin projecting from the wheel in a direction generally parallel to the wheel pivot axis at a location spaced from the wheel pivot axis;

a distance counter;

a lever arm mounted to said counter for pivoting movement between a first position and a second position;

means on said counter for indicating a predetermined increment of distance as an incident of said lever arm moving from said first position to said second position;

means for normally biasing the lever arm to said first position; and means on the lever arm residing within the path of the pin as the wheel is rotated for (1) positively transmitting a torque produced by the pin to the lever arm to pivot the lever arm from its first position to its second position as an incident of the wheel being rotated in the first direction and for (2) deflecting in response to a torque produced thereon by said pin with the wheel rotating oppositely to said first direction so that the torque produced by the pin with the wheel rotating oppositely to said one direction is diminished by said means on the lever arm so as not to be transmitted directly to said lever arm, wherein said lever arm has a rigid base and the means on the lever arm comprises a piece of hollow flexible tubing attached to the rigid base, wherein the tubing piece has an annular free edge that resides substantially within a plane that makes other than a right angle with the tube axis, said pin acting against and progressively camming the annular free edge of the tubing to progressively bend the tubing as the wheel rotates oppositely to said first direction.

14. A distance measuring device comprising:

a frame;

a wheel mounted to the frame for rotation about an axis and having a peripheral surface to be rolled against a surface to be measured;

at least one elongate pin projecting from the wheel in a direction generally parallel to the wheel pivot axis at a location spaced from the wheel pivot axis;

a distance counter;

a lever arm mounted to said counter for pivoting movement between a first position and a second position;

means on said counter for indicating a predetermined increment of distance as an incident of said lever arm moving from said first position to said second position;

means for normally biasing the lever arm to said first position; and means on the lever arm residing within the path of the pin as the wheel is rotated for (1) positively transmitting a torque produced by the pin to the lever arm to pivot the lever arm from its first position to its second position as an incident of the wheel being rotated in the first direction and for (2) deflecting in response to a torque produced thereon by said pin with the wheel rotating oppositely to said first direction so that the torque produced by the pin with the wheel rotating oppositely to said one direction is diminished by said means on the lever arm so as not to be transmitted directly to said lever arm, wherein said lever arm has a rigid base and the means on the lever arm comprises a piece of hollow flexible tubing attached to the rigid base, wherein the flexible tubing has a peripheral wall and a cut free annular edge remote from the rigid base, said cut tubing being configured so that the pin engages the peripheral wall of the tubing to positively move the lever arm from its first position to its second position as the wheel is pivoted in the first direction and engaging the cut free edge of the tubing to progressively bend the tubing as the wheel is pivoted oppositely to said first direction.

15. A counter for recording measured distances, said counter comprising:

a housing;

mechanism within the housing for giving a visual representation of a measured distance;

a lever arm pivotably connected to the housing for movement in a first direction between first and second positions about a first axis;

cooperating means on the housing mechanism and lever arm for causing the housing mechanism to cumulatively record increments of distance, with one increment being recorded each time the lever arm moves from its first position to its second position; and means fixedly attached to said lever arm and rotatable with said lever arm about said first axis for positively transmitting a predetermined force which is exerted in a first direction on the transmitting means at a predetermined distance from the lever arm pivot axis as a first torque on the lever arm tending to rotate the lever arm in its first direction and for causing less than said first torque to be produced on the lever arm tending to rotate the lever arm oppositely to its first direction as an incident of said predetermined force being applied to the transmitting means oppositely to the first direction at said predetermined distance from the lever arm pivot axis, said means on the lever arm comprising a piece of flexible hollow tubing.

* * * * *